(12) United States Patent
Schmitter et al.

(10) Patent No.: US 11,572,188 B2
(45) Date of Patent: Feb. 7, 2023

(54) AIRCRAFT ENGINE NACELLE WITH ASYMMETRIC FAN COWLS

(71) Applicant: SAFRAN NACELLES, Gonfreville-l'Orcher (FR)

(72) Inventors: Ophélie Schmitter, Moissy-Cramayel (FR); Hazem Kioua, Moissy-Cramayel (FR); Romain Gardel, Moissy-Cramayel (FR); Damien Lemoine, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 17/408,125

(22) Filed: Aug. 20, 2021

(65) Prior Publication Data

US 2022/0055760 A1 Feb. 24, 2022

(30) Foreign Application Priority Data

Aug. 21, 2020 (FR) ...................................... 2008611

(51) Int. Cl.
*B64D 29/08* (2006.01)
*B64D 29/02* (2006.01)
*F01D 25/24* (2006.01)

(52) U.S. Cl.
CPC ............ *B64D 29/08* (2013.01); *B64D 29/02* (2013.01); *F01D 25/24* (2013.01); *F05D 2220/323* (2013.01)

(58) Field of Classification Search
CPC ........ B64D 29/02; B64D 29/06; B64D 29/08; F01D 25/24; F05D 2220/323
See application file for complete search history.

(56) References Cited

U.S. PATENT DOCUMENTS

| | | | | |
|---|---|---|---|---|
| 4,044,973 | A | | 8/1977 | Moorehead |
| 4,585,189 | A | * | 4/1986 | Buxton .................. B64D 29/00 49/113 |
| 4,679,750 | A | * | 7/1987 | Burhans ................ B64D 29/06 244/129.4 |
| 4,825,648 | A | * | 5/1989 | Adamson ............... F01D 25/24 60/797 |
| 5,350,136 | A | | 9/1994 | Prosser et al. |
| 5,755,403 | A | * | 5/1998 | Marche .................. B64D 29/08 244/54 |
| 6,227,485 | B1 | * | 5/2001 | Porte ..................... B64D 29/08 244/54 |

(Continued)

FOREIGN PATENT DOCUMENTS

FR 2862045 A1 5/2005

OTHER PUBLICATIONS

Search Report from French Intellectual Property Office on co-pending FR application (FR2008611) dated Apr. 21, 2021.

*Primary Examiner* — Igor Kershteyn
(74) *Attorney, Agent, or Firm* — KOS IP Law LLP (57) ABSTRACT

A nacelle for an aircraft engine comprising a first fan cowl and a second fan cowl, each fan cowl comprising a hinged end and a closing end, each fan cowl being mobile between a closed operating position and an open maintenance position, the first fan cowl having a larger angular coverage than the second fan cowl, the first fan cowl comprising an upper part connected to a lower part by an intermediate hinge so as to allow the lower part to fold towards the upper part.

18 Claims, 6 Drawing Sheets

(56) References Cited

U.S. PATENT DOCUMENTS

| | | | | |
|---|---|---|---|---|
| 6,869,046 B2* | 3/2005 | McEvoy | ............... | B64D 29/08 |
| | | | | 244/129.4 |
| 7,255,307 B2* | 8/2007 | Mayes | .................. | B64D 29/08 |
| | | | | 244/129.5 |
| 8,686,589 B2* | 4/2014 | Pereira | .................. | B64D 29/08 |
| | | | | 307/115 |
| 2019/0112063 A1 | 4/2019 | Byrne et al. | | |

* cited by examiner

AIRCRAFT ENGINE NACELLE WITH ASYMMETRIC FAN COWLS

TECHNICAL FIELD

This invention relates to the field of aircraft engines, and more particularly to a fan cowl fitted to the nacelle of an engine.

BACKGROUND

In a known manner, an aircraft comprises wings under which one or more engines are mounted using fasteners. Each engine is mounted inside a nacelle that forms a fairing, and also helps to reduce acoustic nuisance.

In order to enable maintenance of the engine, the nacelle usually comprises several mobile cowls to allow access to the engine from the outside, in particular for a visual inspection. Each cowl can be moved between a closed working position in which the cowl covers the engine and an open maintenance position in which the cowl is at a distance from the engine.

Figure 1:
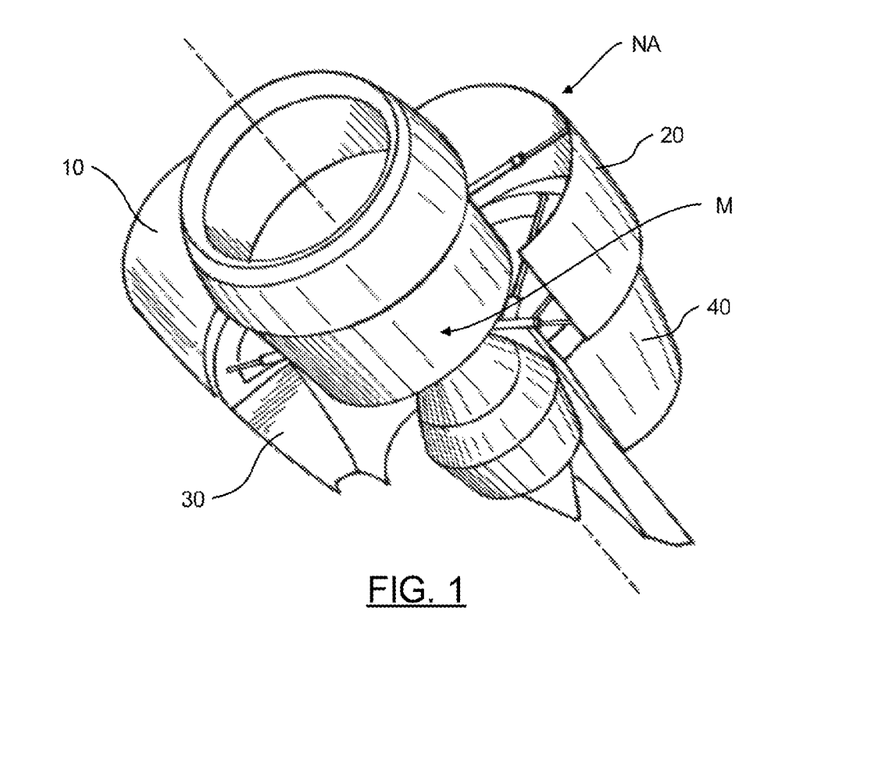
FIG. 1 is a diagrammatic perspective view of a symmetric nacelle and an aircraft engine according to the prior art.
Figure 2:
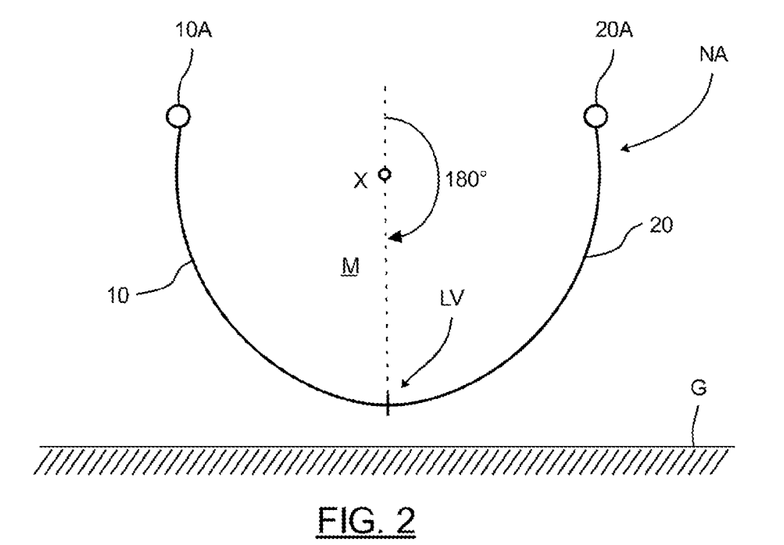
FIG. 2 is a diagrammatic sectional view of the symmetric nacelle in FIG. 1.

With reference to FIG. 1, an engine M mounted in a nacelle NA is shown diagrammatically with fan cowls 10, 20 and reverser cowls 30, 40 in the open maintenance position. As illustrated in FIG. 2, the fan cowls 10, 20 are symmetric and are hinged at lateral hinge points 10A, 20A and are closed along a locking line LV that is located at the bottom point of the nacelle NA, in other words, at 180°. Each fan cowl 10, 20 can thus be moved to a distance from the engine M so that maintenance can be done, independently of the distance between the nacelle NA and the ground G, in other words the ground clearance distance.

During recent developments of engines M, it has been proposed to integrate different equipment, for example a gear train, at the bottom point of the engine (180° position). Such equipment makes it impossible to install a locking line LV at the bottom point of the nacelle NA (position 180°).

Figure 3:
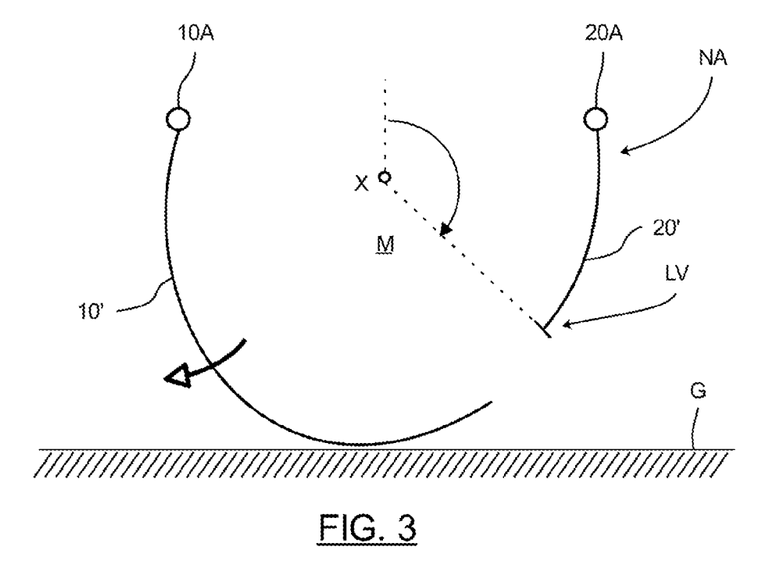
FIG. 3 is a diagrammatic sectional view of an asymmetric nacelle.

With reference to FIG. 3, it has been proposed that this disadvantage can be eliminated by offsetting the angular position of the locking line LV, thus forming two asymmetric fan cowls 10', 20'. Such a solution is not satisfactory since the longest fan cowl 10' cannot be fully opened due to the ground clearance.

The invention thus aims to eliminate at least some of these disadvantages by providing a nacelle comprising two asymmetric fan cowls that can be opened over an angular range similar to the angular range of symmetric fan cowls.

Incidentally, in prior art, patent application FR2933071 discloses the use of symmetric fan cowls for an engine connected to a wing by lateral fasteners. This nacelle is very unusual since the fan cowls are hinged directly to the aircraft.

Patent application FR3024435 also discloses the use of symmetric fan cowls, each of which has several hinges. The closing ends of the fan cowls are guided by the reverser cowls and the air inlet. Such a structure cannot be used for an asymmetric fan cowl with a large angular coverage that extends beyond the low point, since guidance is not possible.

SUMMARY

The invention relates to a nacelle for an aircraft engine comprising a first fan cowl and a second fan cowl, each fan cowl having a hinged end and a closing end, each fan cowl being mobile between a closed operating position in which the fan cowl covers the aircraft engine, and an open maintenance position in which the fan cowl is at a distance from the aircraft engine.

The invention is remarkable in that the first fan cowl has a larger angular coverage than the second fan cowl, the first fan cowl comprising an upper part attached to a lower part by an intermediate hinge so as to allow the lower part to fold toward the upper part.

Advantageously, asymmetric fan cowls with different angular coverages make it possible to provide freedom to close the fan cowls depending on the position of components (gear train, etc.) of the aircraft engine. In addition, a locking line positioned at the bottom point has the disadvantage of interfering with visual detection by an operator that the fan cowls are locked.

A first fan cowl made of two parts can eliminate the disadvantages of the ground clearance, despite its large angular coverage. This is particularly advantageous since the ground clearance can vary significantly depending on the environment (shape of the runway) or conditions (tire deflation, wing bending under the fuel load, hydraulic leak in the landing gear, etc.).

Preferably, the second fan cowl does is free from intermediate hinge. This advantageously helps to reduce the complexity of the second fan cowl that has a smaller angular coverage.

According to one aspect of the invention, the upper part and the lower part of the first fan cowl have substantially the same angular coverage. Thus, folding of the first fan cowl is optimal and the space occupied in the folded position can be limited. Substantially means a difference in the angular coverage of less than 10° and preferably less than 5°.

Preferably, the upper part of the first fan cowl and the second fan cowl have substantially the same angular coverage. Thus in the open position, the lateral dimension of the space occupied by the first cowl and the second cowl is the same, thus avoiding any contact with nearby equipment or with the aircraft. Substantially means a difference in the angular coverage of less than 10° and preferably less than 5°.

Preferably, the hinged ends of the fan cowls are positioned at a same vertical height. This thus makes it possible for the fan cowls to open symmetrically. Alternatively, the hinged ends of the fan cowls are positioned at different vertical heights.

Preferably, the nacelle extending along a horizontal axis, the first fan cowl and the second fan cowl being configured to close along a locking line angularly offset from a 180° angular position defined relative to the horizontal axis, the 0° angular position being defined relative to a vertical reference axis, passing through the horizontal axis, facing upwards. The locking line is advantageously positioned asymmetrically. The locking line is preferably located at an angular position between the 90° position and the 270° position.

The first fan cowl and the second fan cowl may or may not be connected to each other when in the closed operating position.

The invention also relates to an assembly of an engine and a nacelle as presented above, in which the engine is mounted.

The invention also relates to an aircraft comprising at least one assembly as presented above.

The invention also relates to a method of opening the fan cowls of a nacelle as presented above wherein, with the fan cowls being in the closed operating position, the method comprises:

a step of opening the first fan cowl, during which the lower part is hinged to the upper part so as to allow the lower part to fold towards the upper part, and a step of opening the second fan cowl.

The first fan cowl is advantageously folded when it is opened, while the second fan cowl is moved as a single piece.

BRIEF DESCRIPTION OF THE DRAWINGS

The invention will be better understood after reading the following description, given as an example and with reference to the following figures given as non-limitative examples, wherein identical references are given to similar objects and.

It should be noted that the figures present the invention in a detailed manner so that the invention can be put into practice, obviously said figures can be used to better define the invention if necessary.

DETAILED DESCRIPTION

Figure 4A:
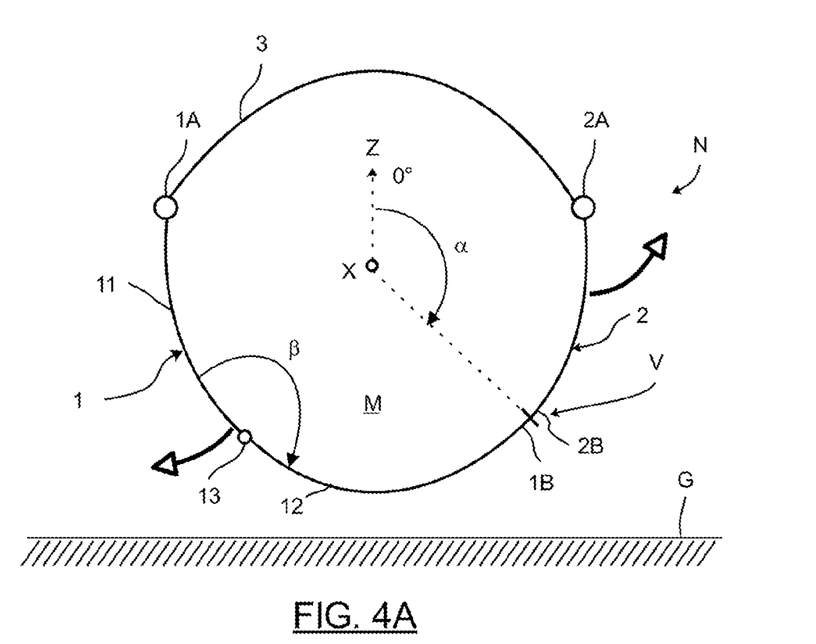
FIGS. 4A, 4B and 4C are diagrammatic sectional views of a nacelle in one embodiment of the invention in the closed position.
Figure 4B:
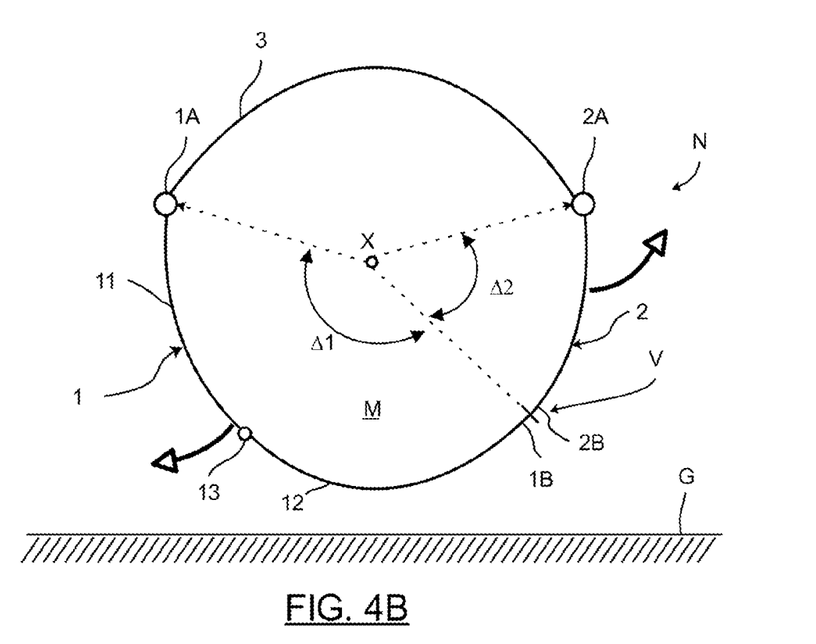
Figure 4C:
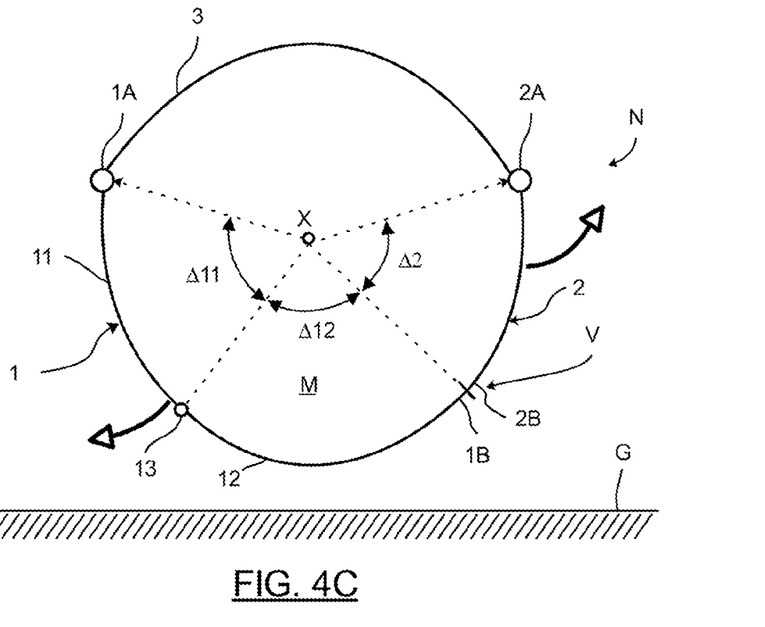

With reference to FIGS. 4A, 4B and 4C, a nacelle N is represented mounted on an aircraft engine M. A nacelle axis X is then defined that extends horizontally, and a vertical reference axis Z is defined passing through the nacelle axis X, and oriented upwards. This vertical reference axis Z defines a 0° reference angular position. In this example, the nacelle axis X also corresponds to the axis of the engine M.

In this example, the engine M is suspended from an aircraft wing by upper fasteners (not represented). In other words, the upper fasteners are located at the 0° angular position.

As illustrated in FIG. 4A, the nacelle N has a first fan cowl 1 and a second fan cowl 2, each fan cowl 1, 2 comprising a hinged end 1A, 2A and a closing end 1B, 2B. Due to their hinged ends 1A, 2A, each fan cowl 1, 2 can be moved between a closed working position in which the fan cowl 1, 2 covers the aircraft engine M and an open maintenance position in which the fan cowl 1, 2 is at a distance from the aircraft engine M.

In this example, the closing ends 1B, 2B are free, in other words they are not guided, when the fan cowls 1, 2 are opened. It is nevertheless obvious that the closing ends 1B, 2B could be guided.

According to the invention, the first fan cowl 1 has a larger angular coverage than the second fan cowl 2. In other words, the fan cowls 1, 2 are asymmetric.

With reference to FIG. 4A, the first fan cowl 1 and the second fan cowl 2 are configured to close in a locking line V angularly offset from the 180° angular position (bottom point). In this example, the locking line V is located at an angular position a equal to between 90° and 270°. In this example, the engine M comprises equipment at the low points (for example a gear train) that prevents locking at 180°.

The limits of the angular ranges are defined in the plane transverse to the X axis in which the vertical reference axis Z defines the 0° reference angular position.

In this example, the nacelle N comprises a frame 3 onto which the hinged ends 1A, 2A of the fan cowls 1, 2 are connected. The hinged ends 1A, 2A of the fan cowls 1, 2 are positioned at the same vertical height, i.e., symmetrically. This allows a similar opening on each side despite the fact that fan cowls 1, 2 are asymmetric. The frame 3 is fixed and covers an upper part of the engine M, preferably over an angular coverage between the 90° position and the 270° position. Obviously, the hinged ends 1A, 2A of the fan cowls 1, 2 could be positioned at different vertical heights, in particular to take account of the space occupied by any engine equipment and/or the aerodynamic lines of the nacelle.

The first fan cowl 1 has a larger angular coverage than the second fan cowl 2 (asymmetric nature). With reference to FIG. 4B, the first fan cowl 1 has an angular coverage $\Delta 1$ between the 90° and 360° positions, preferably between the 110° and 360° positions, even more preferably less than the 270° position The second fan cowl 2 has an angular coverage $\Delta 2$ between the 0° position and the 180° position. Thus, the locking line V is located at an angular position a between the 90° position and the 270° position.

According to the invention, the first fan cowl 1 comprises an upper part 11 connected to a lower part 12 by an intermediate hinge 13 in order to allow the lower part 12 to fold towards the upper part 11. The upper part 11 comprises the hinged end 1A while the lower part 12 comprises the closing end 1B. Obviously, the first fan cowl 1 could comprise than one intermediate hinge and could thus comprise several foldable parts.

Such a first fan cowl 1 reduces the space occupied, which is advantageous when the ground clearance G is low. Thus, the first fan cowl 1 and the second fan cowl 2 can both be opened with a large amplitude, which makes it easier for operators to access the engine M. The second fan cowl 2 is free from intermediate hinge.

As illustrated in FIG. 4C, the upper part 11 and the lower part 12 of the first fan cowl 1 have substantially the same angular coverage $\Delta 11$, $\Delta 12$. This advantageously enables optimum folding of the lower part 12 towards the upper part 11. Substantially means a difference in the angular coverage of less than 10° and preferably less than 5°.

Figure 7:
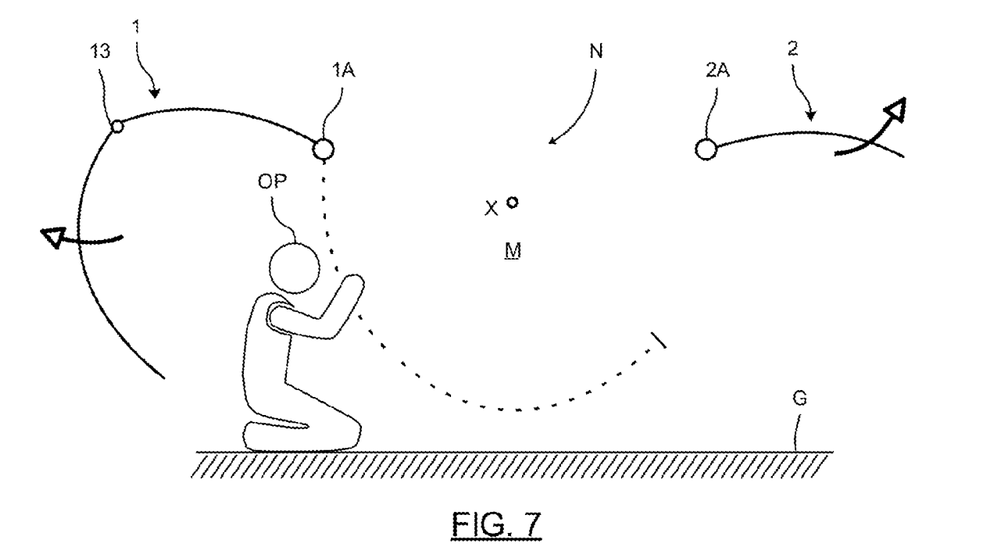
FIG. 7 is a diagrammatic sectional view of the nacelle in FIG. 4 in a third degree of opening, with an operator performing a maintenance operation.

Preferably, the upper part 11 of the first fan cowl 1 and the second fan cowl 2 have substantially the same angular coverage $\Delta 11$, $\Delta 2$. Thus, in the maintenance position, the lateral space occupied by the fan cowls 1, 2 is advantageously similar, as illustrated in FIG. 7. Substantially means a difference in the angular coverage of less than 10° and preferably less than 5°.

In order to facilitate the displacement of the fan cowls 1, 2, the nacelle N preferably comprises lifting aids, for example jacks. In this example, with reference to FIG. 6, each fan cowl 1, 2 is associated with a lifting aid 14, 24.

The invention also relates to a method of opening the fan cowls 1, 2 of a nacelle N as presented above, the fan cowls 1, 2 being in the closed operating position. The first fan cowl and the second fan cowl may or may not be connected to each other when in the closed operating position.

Firstly, the operator performs a step to unlock the fan cowls 1, 2 along their locking line V. Such unlocking is practical since the locking line V is offset from the 180° angular position.

The method comprises a step of opening the first fan cowl 1 during which the lower part 12 is hinged to the upper part 11 so as to allow the lower part 12 to fold towards the upper part 11, and a step of opening the second fan cowl 2

Figure 5:
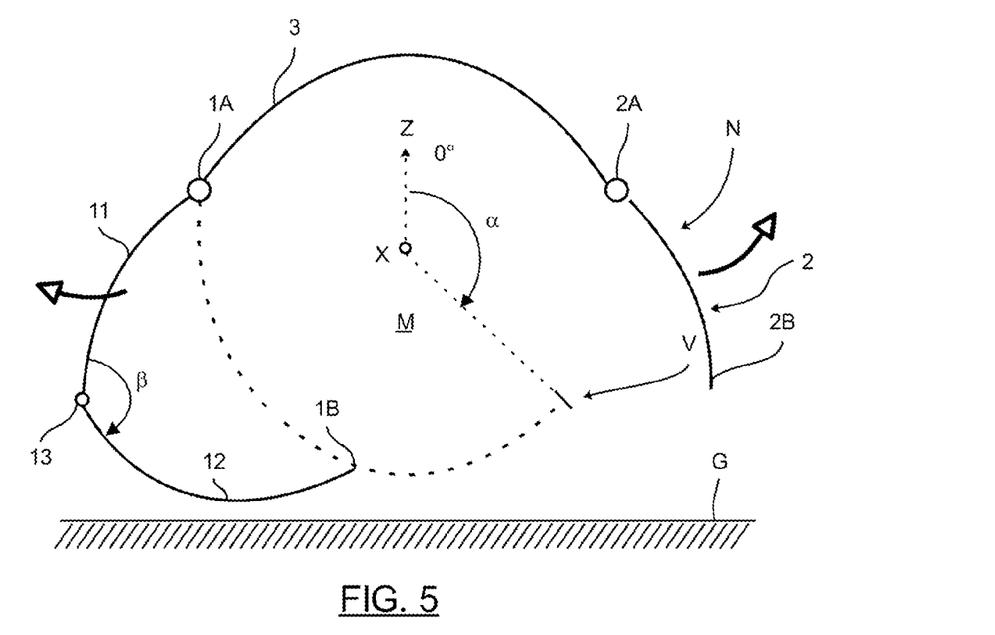
FIG. 5 is a diagrammatic sectional view of the nacelle in FIG. 4, in a first degree of opening.
Figure 6:
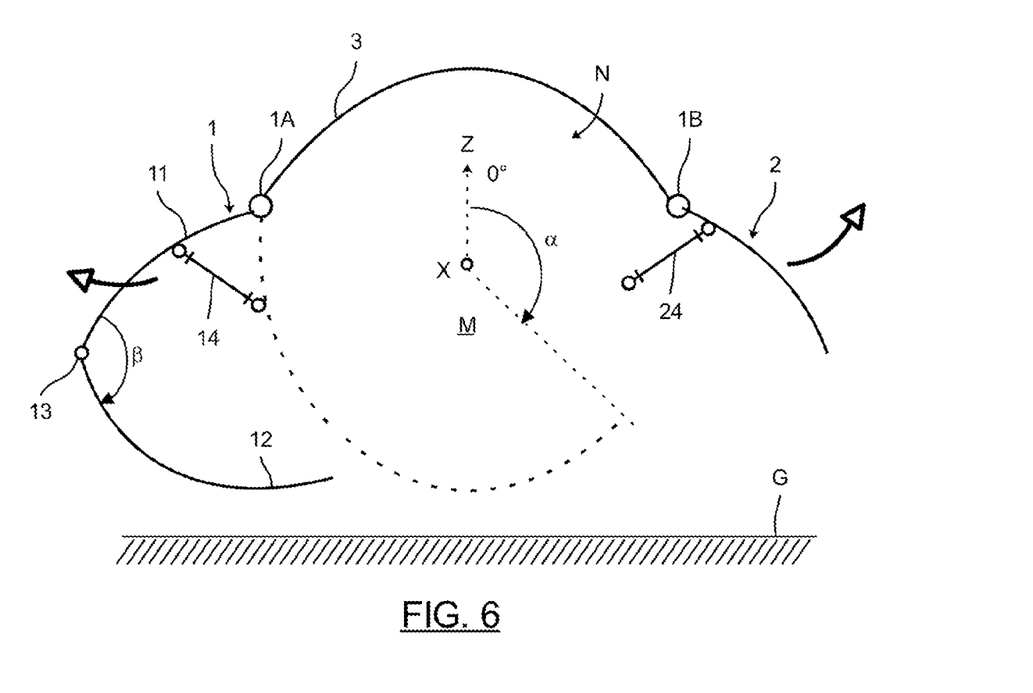
FIG. 6 is a diagrammatic sectional view of the nacelle in FIG. 4, in a second degree of opening.

During the step of opening the first fan cowl 1, the angle β formed between the lower part 12 and the upper part 11 gradually decreases as the upper part 11 moves upwards, due to the hinged end 1A as illustrated in FIGS. 5 to 7. The presence of an intermediate hinge 13 on only the first fan cowl 1 makes it possible to fold the fan cowl 1 while the second fan cowl 2 moves as a single piece. With reference to FIG. 7, due to its intermediate hinge 13, the first fan cowl 1 is at a long distance from the engine M, which leaves a large amount of space for an operator OP to perform maintenance on the engine M. Similarly, due to its short length, the second fan cowl 2 is also at a long distance from the engine M. The opening of the first fan cowl 1 is not hindered by the presence of the ground G. In addition, the space occupied at the side of each fan cowl 1, 2 is similar despite the fact that the fan cowls are asymmetric.

The invention claimed is:

1. A nacelle for an aircraft engine, said aircraft engine is configured to be suspended under an aircraft wing by upper fasteners, the nacelle comprising:
   a first fan cowl and a second fan cowl, wherein each fan cowl comprising:
      a hinged end and a closing end;
      being mobile between a closed operating position in which the fan cowl covers the aircraft engine, and an open position for allowing aircraft engine maintenance in which the fan cowl is at a distance from the aircraft engine; and
   wherein the first fan cowl has a larger angular coverage than an angular coverage of the second fan cowl;
   wherein the first fan cowl comprises an upper part connected to a lower part by an intermediate hinge so as to allow the lower part to fold towards the upper part when the first fan cowl is in the open position; and
   wherein a surface of the upper part and a surface of the lower part adjacent the intermediate hinge are at a first angle to one another when the first fan cowl is in the closed operating position and the surface of the upper part and the surface of the lower part adjacent the intermediate hinge are at a second angle to one another when the first fan cowl is in the open position, and the second angle being less than the first angle.

2. The nacelle according to claim 1, wherein the second fan cowl is free from an intermediate hinge.

3. The nacelle according to claim 1, wherein the upper part has an angular coverage and the lower part has an angular coverage and wherein the two angular coverages of the upper part and the lower part are substantially equal.

4. The nacelle according to claim 1, wherein the upper part of the first fan cowl has an angular coverage that is substantially equal to the angular coverage of the second fan cowl.

5. The nacelle according to claim 1, wherein the hinged ends of the first fan cowl and the second fan cowl are positioned at a same vertical height.

6. The nacelle according to claim 1, said nacelle extending along a horizontal axis, and wherein the first fan cowl and the second fan cowl being configured to close along a locking line angularly offset from a 180° angular position defined relative to the horizontal axis, a 0° angular position being defined relative to a vertical reference axis passing through the horizontal axis.

7. The nacelle according to claim 6, wherein the locking line is located at an angular position between a 90° position and a 270° position.

8. A method of opening fan cowls of the nacelle according to claim 1 wherein, the first and second fan cowls being in the closed operating position, the method comprises:
   opening the first fan cowl, during which the lower part fold towards the upper part about the intermediate hinge, and
   opening the second fan cowl.

9. A nacelle for an aircraft engine, said aircraft engine having a lengthwise axis and configured to be suspended under an aircraft wing, the nacelle comprising:
   a first fan cowl having an upper part and a lower part, said upper part comprising a first hinged end located, elevation wise, above a second hinged end, and said lower part comprising a hinged end and a closing end;
   a second fan cowl having a hinged end and a closing end;
   wherein first fan cowl comprises:
      a closed operating position covering the aircraft engine and wherein a surface of the upper part and a surface of the lower part adjacent the second hinged end are disposed at a first angle to one another; and
      an open position for allowing maintenance to the aircraft engine in which the first fan cowl is pivoted away from the aircraft engine; and
   wherein in the open position, the second hinged end of the upper part is located radially outwardly relative to the lengthwise axis, the closing end of the lower part is located towards the first hinged end of the upper part, and the surface of the upper part and the surface of the lower part adjacent the second hinged end are disposed at a second angle to one another, and the second angle being less than the first angle.

10. The nacelle according to claim 9, wherein the second fan cowl has a single hinged end.

11. The nacelle according to claim 9, wherein the upper part has an angular coverage substantially equal to an angular coverage of the lower part.

12. The nacelle according to claim 9, wherein the upper part of the first fan cowl has an angular coverage substantially equal to an angular coverage of the second fan cowl.

13. The nacelle according to claim 9, wherein the first hinged end of the upper part and the hinged end of the second fan cowl are positioned at about a same vertical height.

14. The nacelle according to claim 9, wherein the first fan cowl and the second fan cowl are configured to close along a locking line angularly offset from a 180° angular position defined relative to the lengthwise axis, a 0° angular position being defined relative to a vertical reference axis passing through the horizontal axis.

15. The nacelle according to claim 14, wherein the locking line is located at an angular position between a 90° position and a 270° position.

16. The nacelle according to claim 9, further comprising a lifting aide attached to the upper part of the first fan cowl for lifting the upper part in the open position.

17. The nacelle according to claim 9, wherein the second fan cowl has a closed operating position covering the aircraft engine and an open position for allowing maintenance to the aircraft engine in which the second fan cowl is pivoted away from the aircraft engine.

18. The nacelle according to claim 9, wherein the second hinged end of the upper part is located, elevation-wise, above the first hinged end in the open position.

\* \* \* \* \*